United States Patent
Suzuki et al.

(10) Patent No.: US 6,432,574 B1
(45) Date of Patent: Aug. 13, 2002

(54) ELECTRODE TAB FOR A NONAQUEOUS ELECTROLYTE SECONDARY BATTERY AND METHOD OF FORMING THE SAME

(75) Inventors: Hiromi Suzuki; Tsuyoshi Kitami; Takayuki Inoi; Susumu Saito, all of Tokyo (JP)

(73) Assignee: NEC Corporation, Tokyo (JP)

( * ) Notice: Subject to any disclaimer, the term of this patent is extended or adjusted under 35 U.S.C. 154(b) by 94 days.

(21) Appl. No.: 09/604,981

(22) Filed: Jun. 28, 2000

(30) Foreign Application Priority Data

Jun. 28, 1999 (JP) .......................... 11-181741

(51) Int. Cl.[7] .............................. H01M 6/10; H01M 2/26
(52) U.S. Cl. ..................... 429/94; 429/161; 429/211; 29/623.1
(58) Field of Search .................... 429/94, 161, 211; 29/633.1

(56) References Cited

U.S. PATENT DOCUMENTS

| | | | |
|---|---|---|---|
| 3,732,124 A | * | 5/1973 | Cailley |
| 4,554,227 A | * | 11/1985 | Takagaki et al. |
| 5,849,431 A | | 12/1998 | Kita et al. |
| 5,972,532 A | * | 10/1999 | Oweis et al. |
| 6,187,062 B1 | * | 2/2001 | Oweis et al. |
| 6,187,473 B1 | * | 2/2001 | Tamezane et al. |
| 6,284,408 B1 | * | 9/2001 | Akazawa et al. |

FOREIGN PATENT DOCUMENTS

| | | |
|---|---|---|
| JP | 56-45567 | 4/1981 |
| JP | 05-062685 | * 3/1993 |
| JP | 7-6749 | 1/1995 |
| JP | 10-83833 | 3/1998 |
| JP | 11-31497 | 2/1999 |
| JP | 11-144991 | 5/1999 |
| JP | 11-167914 | 6/1999 |
| JP | 2000-277154 | 10/2000 |

* cited by examiner

*Primary Examiner*—Carol Chaney
*Assistant Examiner*—Susy Tsang-Foster
(74) *Attorney, Agent, or Firm*—Young & Thompson

(57) ABSTRACT

A nonaqueous electrolyte secondary battery having a cylindrically shaped battery element includes positive and negative electrodes and a separator sandwiched between the positive and negative electrodes. Each of the positive and negative electrodes has an active material free region, on which no active material is applied. The active material free region has a projecting edge region which projects or extends beyond a first side edge of the separator, wherein a first end of the cylindrically shaped battery element includes the projecting edge region of the active material free region of one of the positive and negative electrodes, and the first end of the cylindrically shaped battery element has a depressed portion. An electrode tab has a first portion engaged within and welded to the depressed portion and a second portion electrically in contact with an electrode terminal.

13 Claims, 15 Drawing Sheets

ELECTRODE TAB FOR A NONAQUEOUS ELECTROLYTE SECONDARY BATTERY AND METHOD OF FORMING THE SAME

BACKGROUND OF THE INVENTION

The present invention relates to a nonaqueous electrolyte secondary battery, and more particularly to a nonaqueous electrolyte secondary battery capable of highly efficient charge and discharge.

A typical one of the nonaqueous electrolyte secondary batteries is a lithium ion secondary battery having a negative electrode which may be doped and de-doped with lithium and a positive electrode including a transition metal oxide. The negative electrode comprises a stripe-shaped negative electrode collector applied with a negative electrode active material. The positive electrode comprises a stripe-shaped positive electrode collector applied with a positive electrode active material. The negative electrode and the positive electrode sandwich a separator to form a lamination structure. The lamination structure is enclosed in a package. Alternatively, it is possible that the lamination structure is rolled to form a cylindrically shaped battery element so called as a Jelly-roll so that the cylindrically shaped battery element is accommodated in a cylindrically shaped battery can.

The cylindrically shaped battery is superior in seal-ability and allows a uniform battery reaction over sites of the cylindrically shaped battery element. If the nonaqueous electrolyte secondary battery is required to supply a large current, then the cylindrically shaped battery is suitable and important. The cylindrically shaped nonaqueous electrolyte secondary battery is attractive as a large battery for electric car, electric auxiliary bicycle and the like.

FIG. 1A is a cross sectional elevation view illustrative of a conventional cylindrically shaped nonaqueous electrolyte secondary battery. FIG. 1B is a view illustrative of a pair of positive and negative electrodes included in the conventional cylindrically shaped nonaqueous electrolyte secondary battery shown in FIG. 1A. FIG. 1C is a schematic perspective view illustrative of a cylindrically shaped battery element comprising a rolled structure of laminations of a separator sandwiched by positive and negative electrodes included in the conventional cylindrically shaped nonaqueous electrolyte secondary battery shown in FIG. 1A.

A cylindrically shaped nonaqueous electrolyte secondary battery 51 comprises a cylindrically shaped battery can 52 and a cylindrically shaped battery element 56 contained in the cylindrically shaped battery can 52. The cylindrically shaped battery element 56 comprises a rolled structure of laminations of stripe-shaped positive and negative electrodes 54 and 53 sandwiching a stripe-shaped separator 55. The stripe-shaped positive electrode 54 comprises a stripe-shaped positive electrode collector applied with a positive electrode active material. The stripe-shaped negative electrode 53 comprises a stripe-shaped negative electrode collector applied with a negative electrode active material. The stripe-shaped separator 55 is wider in width than the stripe-shaped negative and positive electrodes 53 and 54, so that opposite sides of the laminations comprise opposite sides of the stripe-shaped separator 55. Thus, opposite ends of the rolled structure of the laminations comprise opposite sides of the stripe-shaped separator 55. The cylindrically shaped battery can 52 may serve as a negative electrode side terminal, wherein the stripe-shaped negative electrode 53 is electrically connected to the cylindrically shaped battery can 52 through a negative electrode tab 57. A first end of the negative electrode tab 57 is bonded to the stripe-shaped negative electrode 53 and a second end of the negative electrode tab 57 is bonded by welding to an inner wall of the cylindrically shaped battery can 52.

If the cylindrically shaped nonaqueous electrolyte secondary battery is required to perform highly efficient charge and discharge operations, then a plurality of negative electrode tabs are bonded by welding to the inner wall of the cylindrically shaped battery can in order to reduce an IR-loss and allow a uniform battery reaction.

Positive electrode tabs 58 are also provided. A first end of each of the positive electrode tabs 58 is bonded to the stripe-shaped positive electrodes 54 and a second end of the positive electrode tabs 58 is bonded to a battery header 59 which serves as a positive electrode side terminal. The battery header 59 is provided with a pressure release valve or a pressure control valve for releasing an internal pressure of the battery if the internal pressure is excessively increased.

As shown in FIG. 1B, the stripe-shaped positive electrode 54 comprises the stripe-shaped positive electrode collector applied with the positive electrode active material except for a one-side active material free region. Namely, the one side active material free region is not applied with the positive electrode active material. The positive electrode tabs 58 are bonded by welding to the one-side active material free region of the stripe-shaped positive electrode collector of the stripe-shaped positive electrode 54. Also, the stripe-shaped negative electrode 53 comprises the stripe-shaped negative electrode collector applied with the negative electrode active material except for a one-side active material free region. Namely, the one side active material free region is not applied with the negative electrode active material. The negative electrode tabs 57 are bonded by welding to the one-side active material free region of the stripe-shaped negative electrode collector of the stripe-shaped negative electrode 53. The stripe-shaped negative and positive electrodes 53 and 54 sandwich the stripe-shaped separator 55 to form the lamination. The lamination is then rolled to form the rolled structure of the lamination, wherein the rolled structure forms the cylindrically shaped battery element as shown in FIG. 1C. The cylindrically shaped battery element is accommodated in the cylindrically shaped battery can 52. The negative electrode tabs 57 and the positive electrode tabs 58 are so long as to increase the losses of currents at the negative electrode tabs 57 and the positive electrode tabs 58. It is also difficult to make uniform the length of the plural electrode leads, the current losses are likely to be non-uniform between the negative electrode tabs 57 and the positive electrode tabs 58. This may cause that part of the negative electrode tabs 57 and the positive electrode tabs 58 shows a heat generation. The current distribution is different between the adjacent part and far apart from the bonding part of each of the negative electrode tabs 57 and the positive electrode tabs 58. Those make it difficult to realize the highly efficient charge and discharge operations.

In Japanese laid-open patent publication No. 7-6749, it is disclosed that a cylindrically shaped secondary battery has positive and negative electrodes and collector terminals with comb-teeth shaped welding portions. This publication also discloses a method of the cylindrically shaped secondary battery.

This conventional method utilizes a spot welding where a welding current is concentrated to projecting portions of the collector. The available electrode materials are limited to materials such as nickel allowing the spot welding. it is also necessary that the separator is thermally stable to the heat generation due to the spot welding.

In Japanese laid-open patent publication No. 9-306465, it is disclosed that a cylindrically shaped secondary battery increases in the number of connecting parts between the positive and negative electrodes and the collectors from the most inner portion to the most outer portion of the cylindrically shaped battery element.

The positive and negative electrodes are connected to the collectors by the spot welding. This spot welding is carried out by plural times of contact of a welding rod to different positions, for which reason it is difficult to realize the exactly desired welding. Further, the electrode material is limited to the material allowing the spot welding.

In the above circumstances, it had been required to develop a novel nonaqueous electrolyte secondary battery free from the above problem.

SUMMARY OF THE INVENTION

Accordingly, it is an object of the present invention to provide a novel nonaqueous electrolyte secondary battery free from the above problems.

It is a further object of the present invention to provide a novel nonaqueous electrolyte secondary battery with a reduced IR-loss by electrode tabs between a battery element and a battery can or a battery cap in highly efficient charge and discharge operations.

It is a still further object of the present invention to provide a novel nonaqueous electrolyte secondary battery showing a uniform current distribution over positions of a battery element.

The present invention provides a nonaqueous electrolyte secondary battery having a cylindrically shaped battery element comprising positive and negative electrodes and a separator sandwiched between the positive and negative electrodes. Each of the positive and negative electrodes has an active material free region, on which no active material is applied. The active material free region has a projecting edge region which projects or extends beyond a first side edge of the separator, wherein a first end of the cylindrically shaped battery element comprises the projecting edge region of the active material free region of one of the positive and negative electrodes, and the first end of the cylindrically shaped battery element has a depressed portion. An electrode tab has a first portion engaged within and welded to the depressed portion and a second portion electrically in contact with an electrode terminal.

The above and other objects, features and advantages of the present invention will be apparent from the following descriptions,

BRIEF DESCRIPTION OF THE DRAWINGS

Preferred embodiments according to the present invention will be described in detail with reference to the accompanying drawings.

DISCLOSURE OF THE INVENTION

Figure 1A:
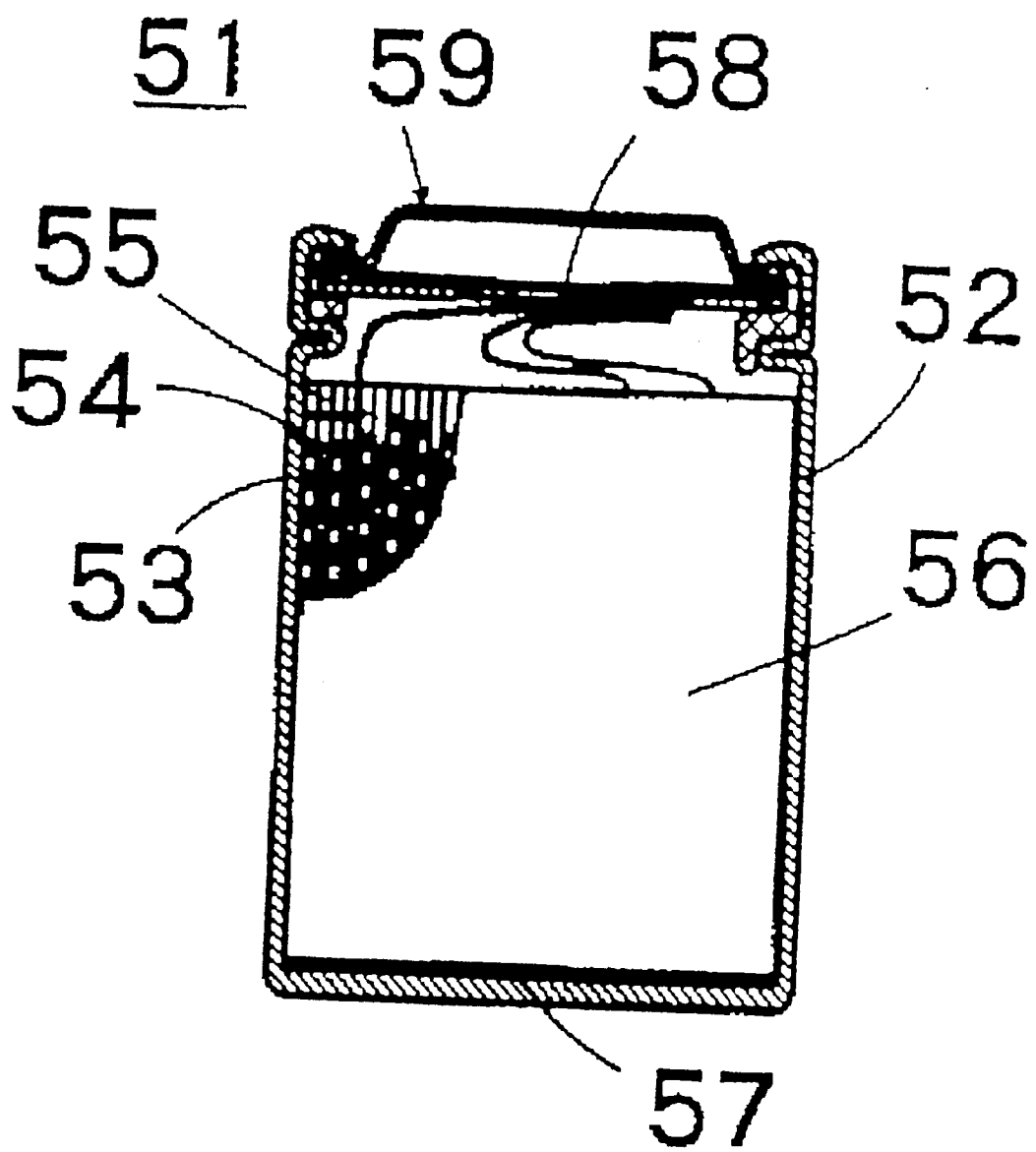
FIG. 1A is a cross sectional elevation view illustrative of a conventional cylindrically shaped nonaqueous electrolyte secondary battery.
Figure 1B:
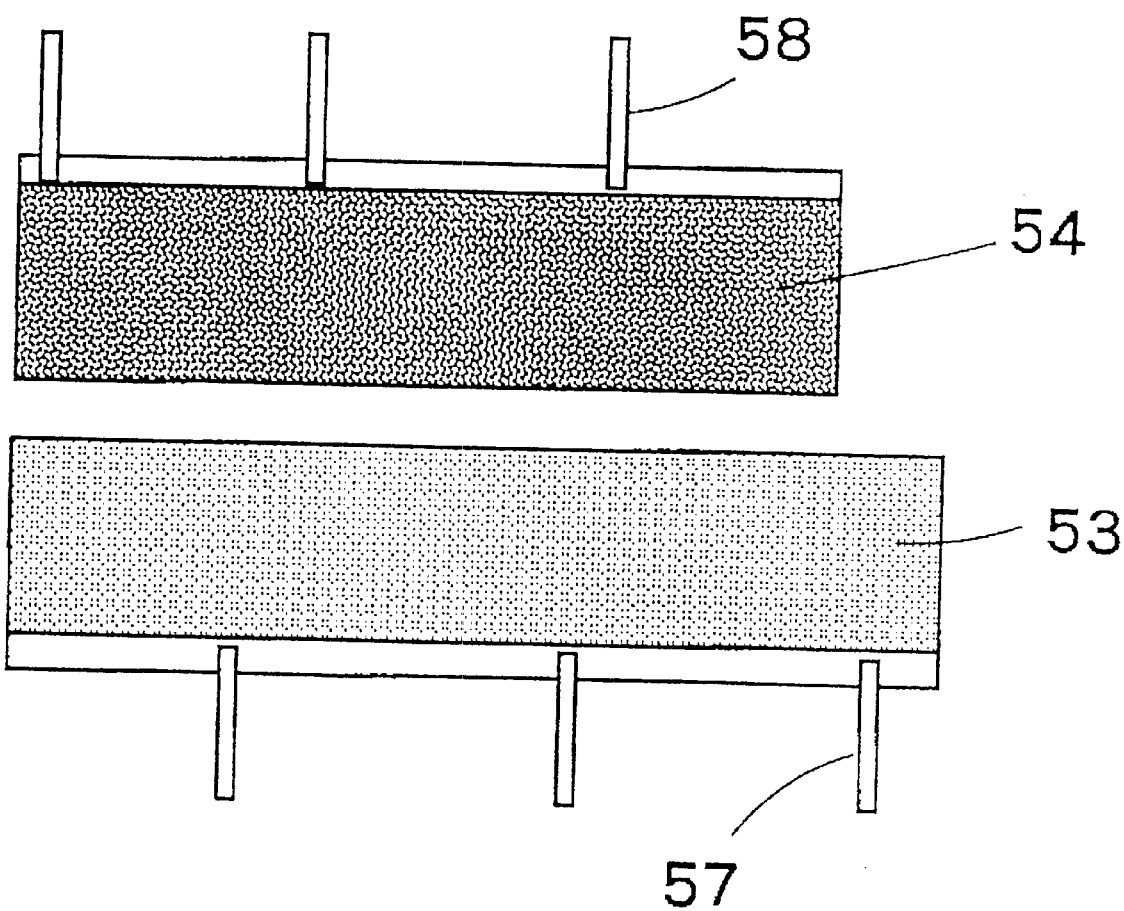
FIG. 1B is a view illustrative of a pair of positive and negative electrodes included in the conventional cylindrically shaped nonaqueous electrolyte secondary battery shown in FIG. 1A.
Figure 1C:
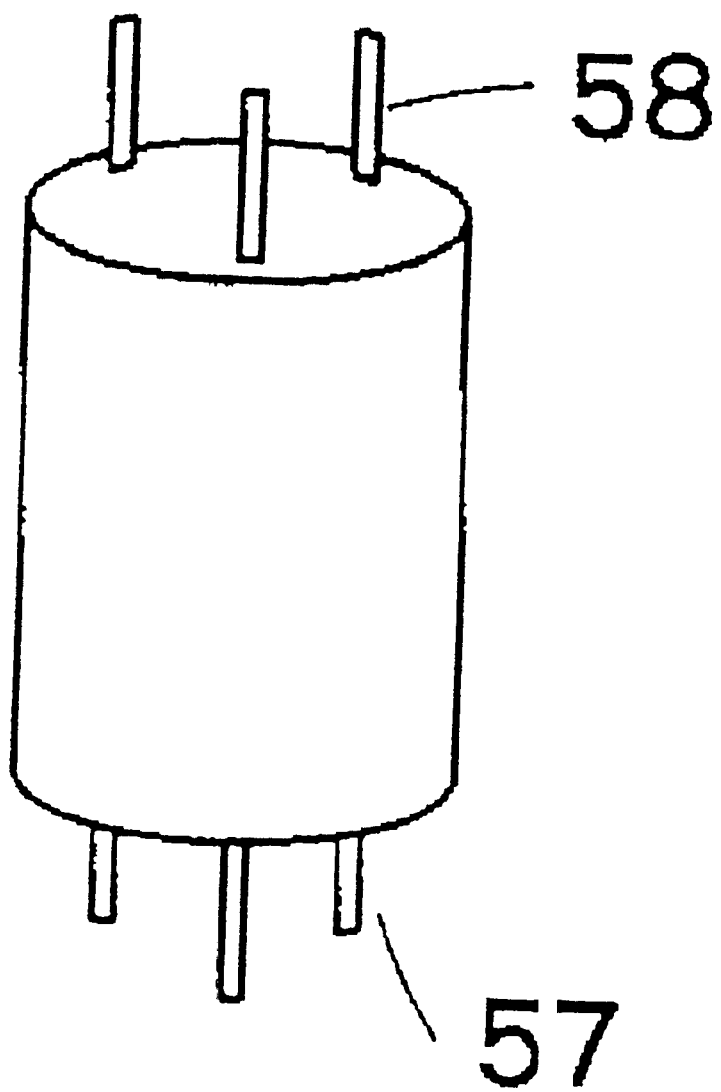
FIG. 1C is a schematic perspective view illustrative of a cylindrically shaped battery element comprising a rolled structure of laminations of a separator sandwiched by positive and negative electrodes included in the conventional cylindrically shaped nonaqueous electrolyte secondary battery shown in FIG. 1A.

The first aspect of the present invention provides an electrode tab bonding structure of a nonaqueous electrolyte secondary battery having a cylindrically shaped battery element comprising positive and negative electrodes and a separator sandwiched between the positive and negative electrodes. Each of the positive and negative electrodes has an active material free region, on which no active material is applied. The active material free region has a projecting edge region which projects or extends beyond a first side edge of the separator, so that a first end of the cylindrically shaped battery element comprises the projecting edge region of the active material free region of one of the positive and negative electrodes, wherein an electrode tab has a first portion engaged within and welded to a depressed portion of the first end of the cylindrically shaped battery element and a second portion electrically in contact with an electrode terminal.

It is preferable that the depressed portion comprises a groove which extends on the first end of the cylindrically shaped battery element.

It is further preferable that the groove comprises a single straight groove which extends across a center of the first end of the cylindrically shaped battery element, and the first portion of the electrode tab is in the form of a single straight sheet.

It is also preferable that the groove comprises plural grooves which radially extend from a center of the first end of the cylindrically shaped battery element, and the first portion of the electrode tab is in the form of radially extending plural segments.

It is also preferable that the electrode tab has an U-curved intermediate portion unitarily connecting the first and second portions to each other.

It is also preferable that the active material free region of the one of the positive and negative electrodes has a width in a direction parallel to an axis of the cylindrically shaped battery element, and the width is in a range of not less than a pitch in a diametrical direction of the one of the positive and negative electrodes to not more than a radius of the cylindrically shaped battery element.

It is also preferable that the active material free region of the one of the positive and negative electrodes is laminated with a porous sheet It is also preferable that the one of the positive and negative electrodes is made of aluminum and the first portion of the electrode tab is welded by an ultrasonic welding. having substantially the same thickness as a layer of the active material.

It is further preferable that the one of the positive and negative electrodes is the positive electrode.

It is also preferable that the electrode terminal in contact with the second portion of the electrode tab comprises an electrically conductive connective part of a battery header.

The aspect of the present invention provides a nonaqueous electrolyte secondary battery having a cylindrically shaped battery element comprising positive and negative electrodes and a separator sandwiched between the positive and negative electrodes. Each of the positive and negative electrodes has an active material free region, on which no active material is applied. The active material free region has a projecting edge region which projects or extends beyond a first side edge of the separator, wherein a first end of the cylindrically shaped battery element comprises the projecting edge region of the active material free region of one of the positive and negative electrodes, and the first end of the cylindrically shaped battery element has a depressed portion. An electrode tab has a first portion engaged within and welded to the depressed portion and a second portion electrically in contact with an electrode terminal.

The third aspect of the present invention provides a method of bonding an electrode tab to one side of a cylindrically shaped battery element of a nonaqueous electrolyte secondary battery. The method comprises the steps of: forming a cylindrically shaped battery element comprising positive and negative electrodes and a separator sandwiched between the positive and negative electrodes, each of the positive and negative electrodes having an active material free region, on which no active material is applied, the active material free region having a projecting edge region which projects or extends beyond a first side edge of the separator, so that a first end of the cylindrically shaped battery element comprises the projecting edge region of the active material free region of one of the positive and negative electrodes; forming a depressed portion on the first end of the cylindrically shaped battery element; placing a first portion of an electrode tab within the depressed portion; and welding the first portion of the electrode tab to the depressed portion.

It is preferable that the first portion of the electrode tub is welded by an ultrasonic welding method.

It is also preferable that the depressed portion is formed by pressing a pressing tool into the first end of the cylindrically shaped battery element.

It is also preferable that the depressed portion is formed by the steps of: forming cutting lines extending through the projecting edge region to form plural fragmentary cut parts of the projecting edge region defined by the cutting lines; and bending plural fragmentary cut parts toward a direction parallel to a plane of the first end of the cylindrically shaped battery element thereby forming the depressed portion.

It is further preferable that the cutting lines arc formed by laser irradiation to the projecting edge region.

PREFERRED EMBODIMENT

Figure 2A:
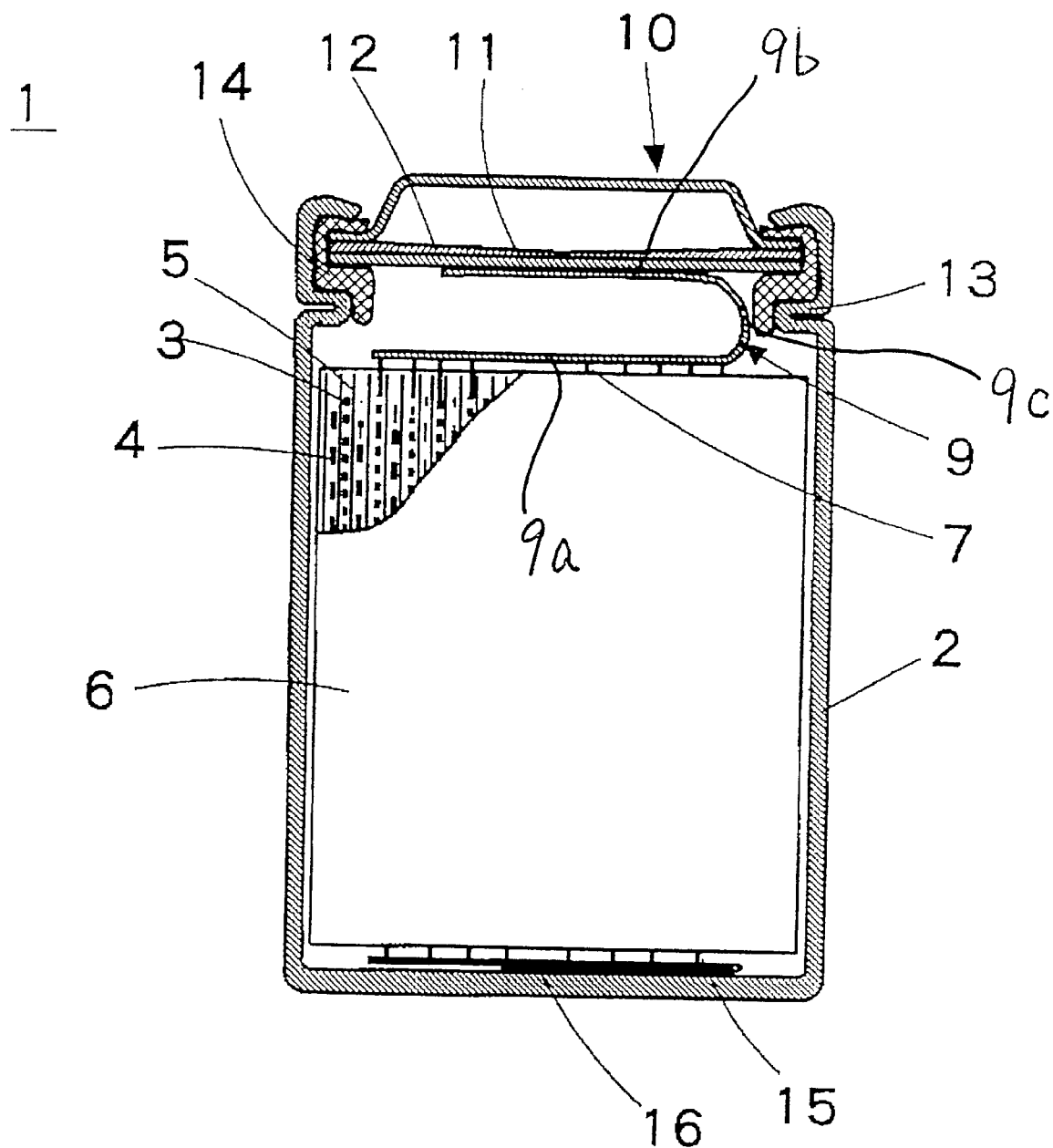
FIG. 2A is a cross sectional elevation view illustrative of a novel nonaqueous secondary battery in a first embodiment in accordance with the present invention.
Figure 2B:
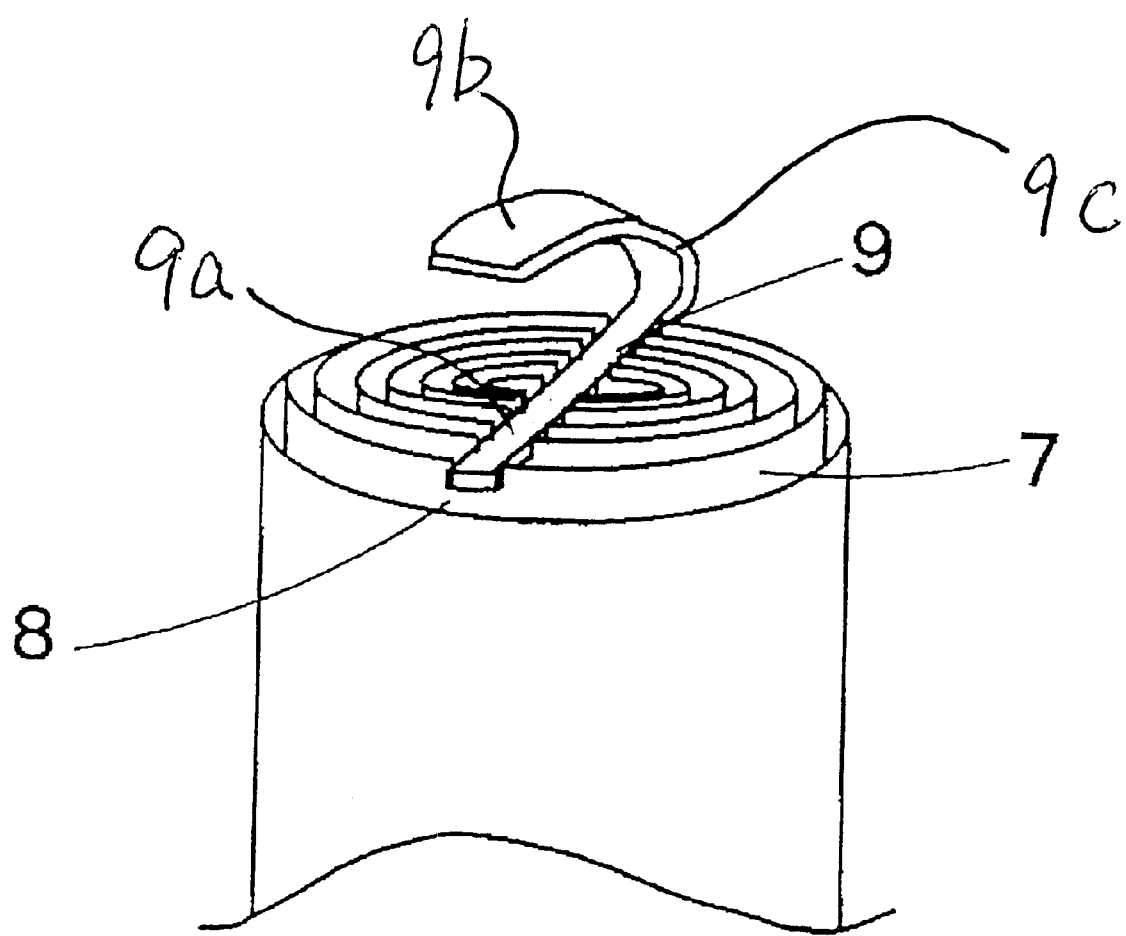
FIG. 2B is a fragmentary schematic perspective view illustrative of one side of a battery element with a positive electrode connecting tab of a novel nonaqueous secondary battery of FIG. 2A.

A first embodiment according to the present invention will be described in detail with reference to the drawings. FIG. 2A is a cross sectional elevation view illustrative of a novel nonaqueous secondary battery in a first embodiment in accordance with the present invention. FIG. 2B is a fragmentary schematic perspective view illustrative of one side of a battery element with a positive electrode connecting tub of a novel nonaqueous secondary battery of FIG. 2A.

A cylindrically shaped nonaqueous electrolyte secondary battery 1 comprises a cylindrically shaped battery can 2 and a cylindrically shaped battery element 6 contained in the cylindrically shaped battery can 2. The cylindrically shaped battery element 6 comprises a rolled structure of laminations of stripe-shaped positive and negative electrodes 3 and 4 sandwiching a stripe-shaped separator 5. The stripe-shaped positive electrode 3 comprises a stripe-shaped positive electrode collector applied with a positive electrode active material. The stripe-shaped negative electrode 4 comprises a stripe-shaped negative electrode collector applied with a negative electrode active material.

The stripe-shaped positive electrode collector has an active material free side region 7, on which no active material is applied. The active material free side region 7 extends beyond a side edge of the stripe-shaped separator 5 and also beyond a side edge of the stripe-shaped negative electrode 4 in a direction parallel to an axis of the rolled structure of the cylindrically shaped battery element 6, so that a first side of the rolled structure of the laminations forming the cylindrically shaped battery element comprises the active material free side region 7 of the stripe-shaped positive electrode 3. The first side of the rolled structure of the cylindrically shaped battery element 6, which comprises the active material free side region 7 of the stripe-shaped positive electrode 3, has a depressed portion 8. Namely, the depressed portion 8 is formed in the active material free side region 7 of the stripe-shaped positive electrode 3. The depressed portion 8 on the first side of the rolled structure or the cylindrically shaped battery element 6 forms a straight slender-shaped groove which extends in a diametrical direction across the center axis of the rolled structure of the cylindrically shaped battery element 6. The depressed portion 8 in the form of the straight slender-shaped groove receives a first contact part 9a of a positive electrode connecting tab 9. Namely, the first contact part 9a of the positive electrode connecting tab 9 extends along and is engaged within the groove of the depressed portion 8. If the stripe-shaped positive electrode 3 is made of aluminum, the first contact part 9a of the positive electrode connecting tab 9 is bonded by an ultrasonic welding method to the depressed portion 8 on the first side of the rolled structure or the cylindrically shaped battery element 6. Namely, the first contact part 9a of the positive electrode connecting tab 9 is bonded to the active material free side region 7 of the stripe-shaped positive electrode 3. The first side of the rolled structure of the cylindrically shaped battery element 6 faces upwardly. The cylindrically shaped battery can 2 has an upper portion engaged with a battery header 10 serving as a cap of the cylindrically shaped battery can 2. The battery header 10 has an electrically conductive connective portion 11 which comprises an electrically conductive flat plate. A second contact part 9b of the positive electrode connecting tab 9 extends on and is bonded with a bottom surface of the electrically conductive connective portion 11 of the battery header 10, so that the stripe-shaped positive electrode 3 is electrically connected through the positive electrode connecting tab 9 to the electrically conductive connective portion 11 which serves as an external connective terminal. The first and second contact parts 9a and 9b of the positive electrode connecting tab 9 are unitarily connected through a U-shaped intermediate part 9c. Namely, the positive electrode connecting tab 9 comprises a single electrically conductive stripe-shaped fragment which is bent to form a U-shape, and the bent portion corresponds to the U-shaped intermediate part 9c. The single electrically conductive stripe-shaped fragment has an elasticity, so that the positive electrode connecting tab 9 shows an elastic force which pushes the cylindrically shaped battery element 6 downwardly, whereby the cylindrically shaped battery element 6 is stabilized in the cylindrically shaped battery can 2. The stabilizing structure may relax an externally applied mechanical shock to the cylindrically shaped battery element 6. The battery header 10 also has a pressure release plate 12 for releasing an excessively increased internal pressure in the cylindrically shaped battery can 2. The battery header 10 may optionally have an electric element for cutting off an access current. The cylindrically shaped battery can 2 has a pinched portion 13 near the top portion of the cylindrically shaped battery can 2, so that the upper portion of the cylindrically shaped battery can 2 is defined between the top portion and the pinched portion 13. A gasket 14 is provided between inner walls of the upper portion of the cylindrically shaped battery can 2 and a peripheral edge of the battery header 10, so that the upper portion of the cylindrically shaped battery can 2 is caulked and the cylindrically shaped battery can 2 is sealed.

As described above, the stripe-shaped negative electrode 4 comprises the stripe-shaped negative electrode collector applied with the negative electrode active material. The stripe-shaped negative electrode collector has an active material free side region 15, on which no active material is applied. The active material free side region 15 extends beyond a side edge of the stripe-shaped separator 5 and also beyond a side edge of the stripe-shaped positive electrode 3 in a direction parallel to an axis of the rolled structure or the cylindrically shaped battery element 6, so that the second side of the rolled structure of the laminations forming the cylindrically shaped battery element comprises the active material free side region 15 of the stripe-shaped negative electrode 4. The second side of the rolled structure of the laminations forming the cylindrically shaped battery element is bonded with and electrically in contact with a bottom of the cylindrically shaped battery can 2, wherein the cylindrically shaped battery can 2 serves as an external connective terminal in the negative electrode side.

Figure 3A:
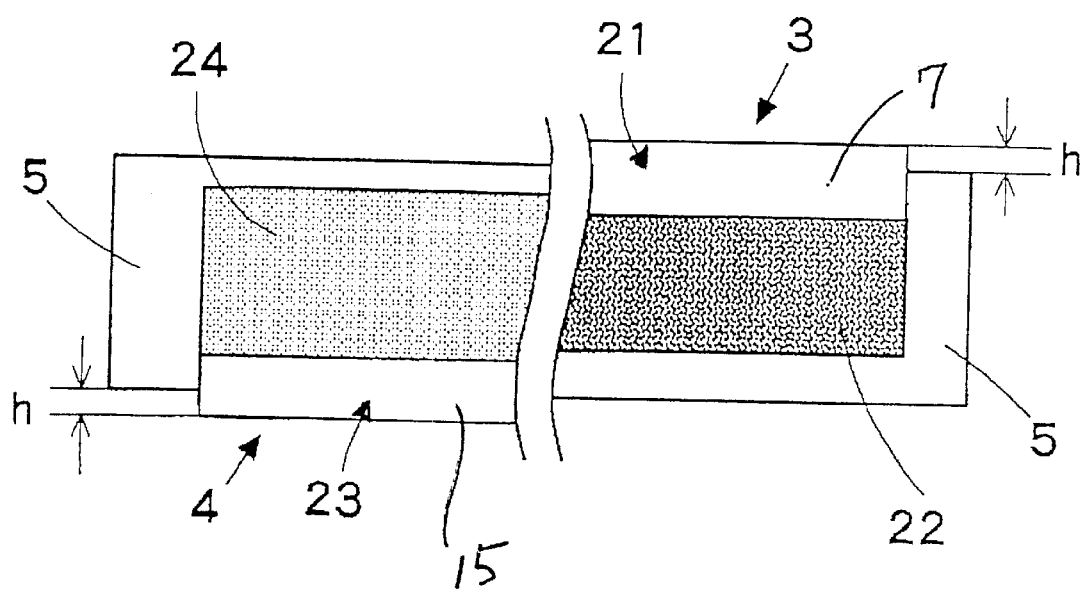
FIG. 3A is a fragmentary plane view illustrative of basic structures of the positive and negative electrodes laminated on the separator of the battery element of the novel nonaqueous electrolyte secondary battery shown in FIGS. 2A and 2B.

FIG. 3A is a fragmentary plane view illustrative of basic structures of the positive and negative electrodes laminated on the separator of the battery element of the novel non-aqueous electrolyte secondary battery shown in FIGS. 2A and 2B. As described above, the stripe-shaped positive electrode 3 comprises a stripe-shaped positive electrode collector 21 comprising an aluminum foil. The stripe-shaped positive electrode collector 21 is selectively formed with a positive electrode active material layer 22. The positive electrode active material layer 22 may be formed by selectively applying a slurry of a positive electrode active material on the stripe-shaped positive electrode collector 21 and drying the applied positive electrode active material. The stripe-shaped negative electrode 4 comprises a stripe-shaped negative electrode collector 23 comprising a copper foil. The stripe-shaped negative electrode collector 23 is selectively formed with a negative electrode active material layer 24. The negative electrode active material layer 24 may be formed by selectively applying a slurry of a negative electrode active material on the stripe-shaped negative electrode collector 23 and drying the applied negative electrode active material.

The stripe-shaped positive electrode collector 21 has an active material free side region 7, on which no active material is applied. The active material free side region 7 has a projecting edge region which projects or extends beyond a first side edge of the stripe-shaped separator 5 by a distance "h" in a first direction parallel to the axis of the rolled structure or the cylindrically shaped battery element 6. The projecting edge region of the active material free side region 7 has a width of the distance "h" in the first direction in the range of not less than a pitch in a diametrical direction of the positive electrode 3 in the form of the cylindrically shaped battery element 6 to not more than a radius of the cylindrically shaped battery element 6. The entire region of the positive electrode active material layer 22 is in contact with the stripe-shaped separator 5.

The stripe-shaped negative electrode collector 23 also has an active material free side region 15, on which no active material is applied.

The active material free side region 15 has a projecting edge region which projects or extends beyond a second side edge of the stripe-shaped separator 5 by a distance "h" in a second direction opposite to the first direction. The projecting edge region of the active material free side region 15 has a width of the distance "h" in the second direction in the range of not less than a pitch in a diametrical direction of the negative electrode 4 in the form of the cylindrically shaped battery element 6 to not more than a radius of the cylindrically shaped battery element 6. The entire region of the negative electrode active material layer 24 is in contact with the stripe-shaped separator 5. A first contact area between the positive electrode active material layer 22 and the stripe-shaped separator 5 is smaller than a second contact area between the negative electrode active material layer 24 and the stripe-shaped separator 5.

Figure 3B:
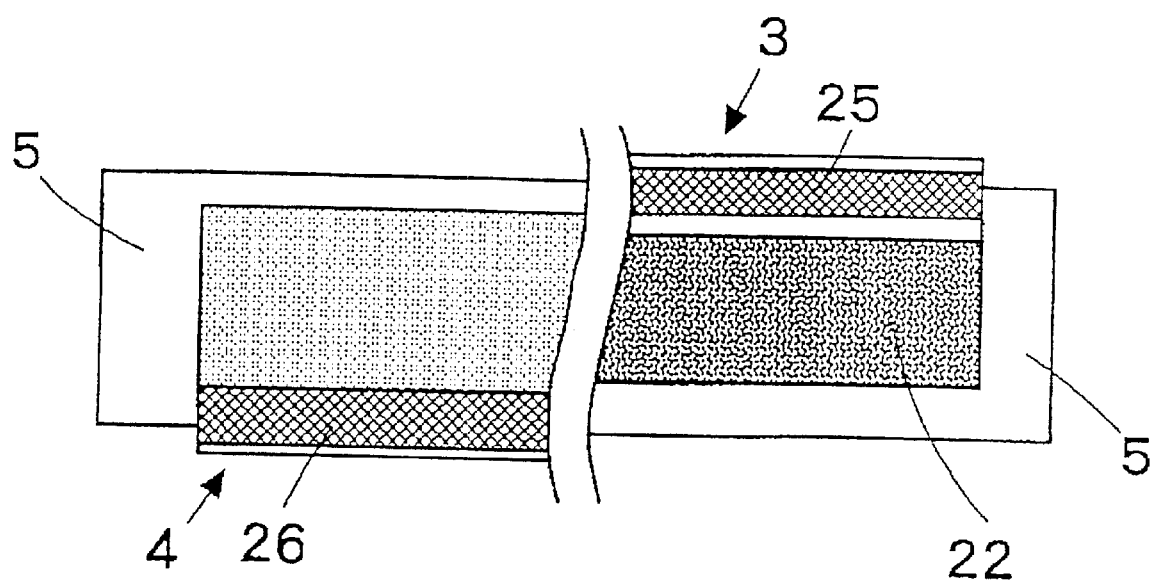
FIG. 3B is a fragmentary plane view illustrative of modified structures of the positive and negative electrodes laminated on the separator of the battery element of the novel nonaqueous electrolyte secondary battery shown in FIGS. 2A and 2B.

FIG. 3B is a fragmentary plane view illustrative of modified structures of the positive and negative electrodes laminated on the separator of the battery element of the novel nonaqueous electrolyte secondary battery shown in FIGS. 2A and 2B. As described above, the stripe-shaped positive electrode 3 comprises a stripe-shaped positive electrode collector 21 comprising an aluminum foil. The stripe-shaped positive electrode collector 21 is selectively formed with a positive electrode active material layer 22. The positive electrode active material layer 22 may be formed by selectively applying a slurry of a positive electrode active material on the stripe-shaped positive electrode collector 21 and drying the applied positive electrode active material. The stripe-shaped negative electrode 4 comprises a stripe-shaped negative electrode collector 23 comprising a copper foil. The stripe-shaped negative electrode collector 23 is selectively formed with a negative electrode active material layer 24. The negative electrode active material layer 24 may be formed by selectively applying a slurry of a negative electrode active material on the stripe-shaped negative electrode collector 23 and drying the applied negative electrode active material.

Further, in this modified example, a positive electrode side stripe-shaped porous sheet 25 is selectively provided on the active material free side region 7 of the stripe-shaped positive electrode collector 21. The positive electrode side stripe-shaped porous sheet 25 has a thickness just equal to or approximately equal to a thickness of the positive electrode active material layer 22. The positive electrode side stripe-shaped porous sheet 25 may comprise any available porous sheet such as non-woven fabrics of a synthetic resin and a metal and a foam resin. The positive electrode side stripe-shaped porous sheet 25 may be bonded by any available bonding methods to the active material free side region 7 of the stripe-shaped positive electrode collector 21. If the synthetic resin is used for the positive electrode side stripe-shaped porous sheet 25, then a thermal welding is available for bonding the positive electrode side stripe-shaped porous sheet 25 to the active material free side region 7 of the stripe-shaped positive electrode collector 21. The positive electrode side stripe-shaped porous sheet 25 preferably extends except on the projecting edge region of the active material free side region 7. It is thus preferable that the positive electrode side stripe-shaped porous sheet 25 is retracted from the edge of the projecting edge region of the active material free side region 7 by the distance "h" which is in the range of not less than a pitch in the diametrical direction of the negative electrode 4 in the form of the cylindrically shaped battery element 6 to not more than the radius of the cylindrically shaped battery element 6. It is, however, possible as a modification that the positive electrode side stripe-shaped porous sheet 25 partially extends on the projecting edge region of the active material free side region 7. The positive electrode side stripe-shaped porous sheet 25 serves as a spacer in the cylindrically shaped battery element 2 so that the positive electrode side stripe-shaped porous sheet 25 as the spacer stabilizes the projecting edge region of the active material free side region 7 and prevents deformation of the projecting edge region of the active material free side region 7 particularly when a pressing tool contacts the depressed portion 8 of the projecting edge region of the active material free side region 7 during ultrasonic welding. The positive electrode side stripe-shaped porous sheet 25 has pores which allows permeation of the electrolyte and allows releasing a gas generated in the cylindrically shaped battery element 6.

Further, in this modified example, a negative electrode side stripe-shaped porous sheet 26 is selectively provided on the active material free side region 15 of the stripe-shaped negative electrode collector 23. The negative electrode side stripe-shaped porous sheet 26 has a thickness just equal to or approximately equal to a thickness of the negative electrode active material layer 24. The negative electrode side stripe-shaped porous sheet 26 may comprise any available porous sheet such as non-woven fabrics of a synthetic resin and a metal and a foam resin. The negative electrode side stripe-shaped porous sheet 26 may be bonded by any available bonding methods to the active material free side region 15 of the stripe-shaped negative electrode collector 23. If the synthetic resin is used for the negative electrode side stripe-shaped porous sheet 26, then a thermal welding is available for bonding the negative electrode side stripe-shaped porous sheet 26 to the active material free side region 15 of the stripe-shaped negative electrode collector 23. The negative electrode side stripe-shaped porous sheet 26 preferably extends except on the projecting edge region of the active material free side region 15. It is thus preferable that the negative electrode side stripe-shaped porous sheet 26 is retracted from the edge of the projecting edge region of the active material free side region 15 by the distance "h" which is in the range of not less than a pitch in the diametrical direction of the negative electrode 4 in the form of the cylindrically shaped battery element 6 to not more than the radius of the cylindrically shaped battery element 6. It is, however, possible as a modification that the negative electrode side stripe-shaped porous sheet 26 partially extends on the projecting edge region of the active material free side region 15. The negative electrode side stripe-shaped porous sheet 26 serves as a spacer in the cylindrically shaped battery element 2 so that the negative electrode side stripe-shaped porous sheet 26 as the spacer stabilizes the projecting edge region of the active material free side region 15 and prevents deformation of the projecting edge region of the active material free side region 15. The negative electrode side stripe-shaped porous sheet 26 have pores which allows permeation of the electrolyte and allows releasing a gas generated in the cylindrically shaped battery element 6.

Figure 4A:
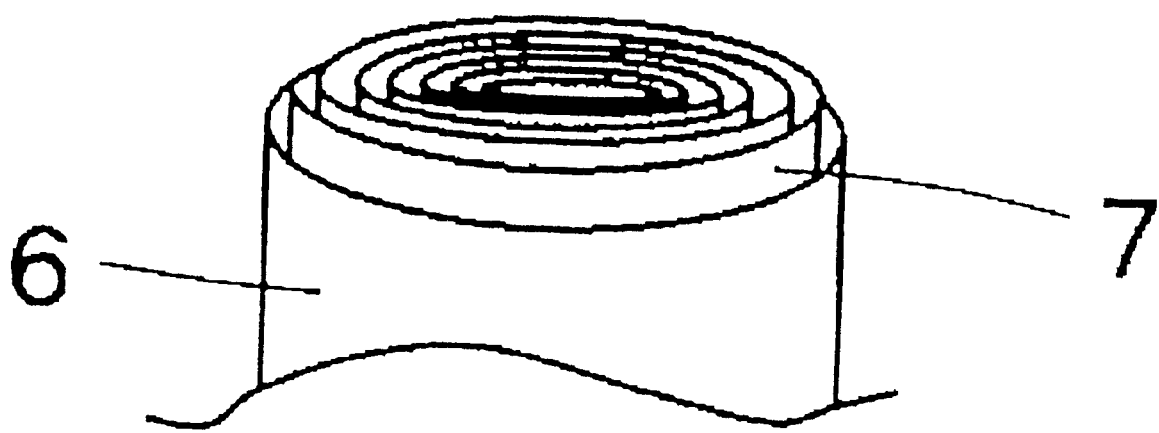
FIGS. 4A through 4C are fragmentary schematic perspective views illustrative of a method of bonding a positive electrode connecting tub to a depressed portion on the first side of the cylindrically shaped battery element of the nonaqueous electrolyte secondary battery in accordance with the present invention.
Figure 4B:
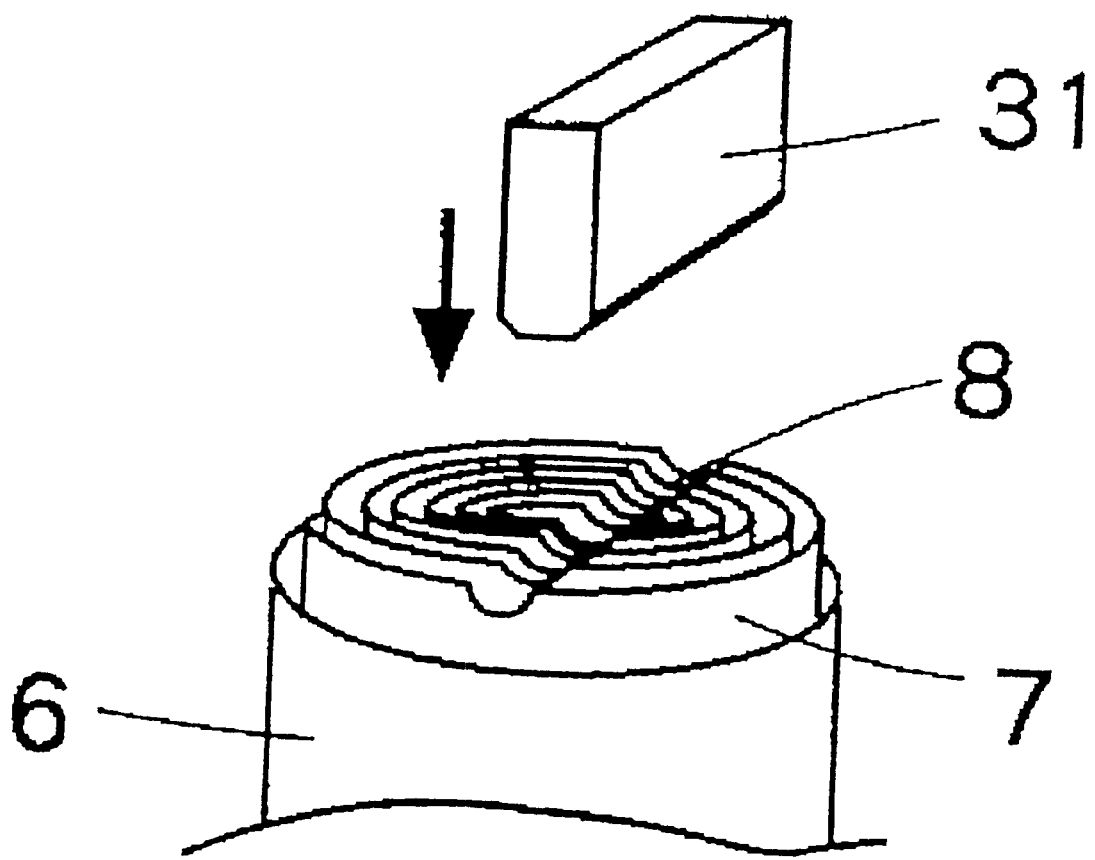
Figure 4C:
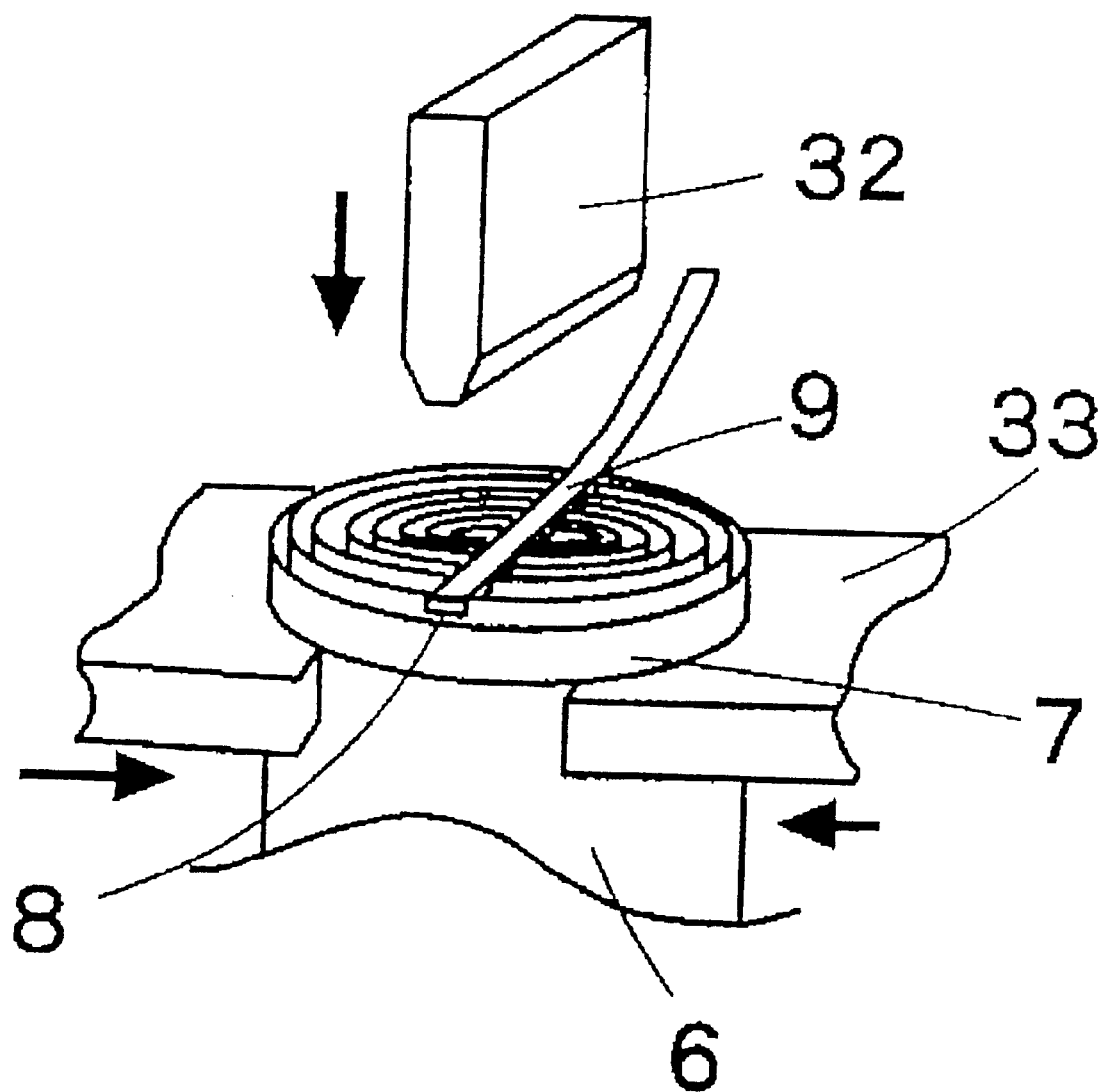

FIGS. 4A through 4C are fragmentary schematic perspective views illustrative of a method of bonding a positive electrode connecting tub to a depressed portion on the first side of the cylindrically shaped battery element of the nonaqueous electrolyte secondary battery in accordance with the present invention.

With reference to FIG. 4A, the stripe-shaped separator 5 and the stripe-shaped positive and negative electrodes 3 and 4 are laminated so that the stripe-shaped separator 5 is sandwiched between the stripe-shaped positive and negative electrodes 3 and 4, wherein the projecting edge region of the active material free side region 7 of the stripe-shaped positive electrode collector 21 of the stripe-shaped positive electrode 3 projects from the first side edge of the stripe-shaped separator 5, whilst the projecting edge region of the active material free side region 15 of the stripe-shaped negative electrode collector 23 of the stripe-shaped negative electrode 4 projects from the second side edge of the stripe-shaped separator 5 thereby to form a lamination structure. This lamination structure is then rolled to form the cylindrically shaped battery element 6, so that the first side of the cylindrically shaped battery element 6 comprises the projecting edge region of the active material free side region 7 of the stripe-shaped positive electrode collector 21 of the stripe-shaped positive electrode 3 whilst the second side of the cylindrically shaped battery element 6 comprises the projecting edge region of the active material free side region 15 of the stripe-shaped negative electrode collector 23 of the stripe-shaped negative electrode 4.

With reference to FIG. 4B, a straight-ridge pressing tool 31 is pressed onto the first side of the rolled structure or the cylindrically shaped battery element 6, so that the depressed portion 8 is formed on the first side of the rolled structure or the cylindrically shaped battery element 6, wherein the depressed portion 8 forms the straight slender-shaped groove which extends in the diametrical direction across the center axis of the rolled structure or the cylindrically shaped battery element 6.

With reference to FIG. 4C, the positive electrode connecting tab 9 is so placed that the depressed portion 8 in the form of the straight slender-shaped groove receives the first contact part 9a of the positive electrode connecting tab 9. Namely, the first contact part 9a of the positive electrode connecting tab 9 extends along and is engaged within the groove of the depressed portion 8. The stripe-shaped positive electrode 3 is made of aluminum. A holder 33 is used for holding the cylindrically shaped battery element 6. A straight-ridge pressing tool 32 contacts the first contact part 9a of the positive electrode connecting tab 9 engaged within the depressed portion 8, so that the first contact part 9a of the positive electrode connecting tab 9 is bonded by an ultrasonic welding method to the depressed portion 8 on the first side of the rolled structure of the cylindrically shaped battery element 6. Namely, the first contact part 9a of the positive electrode connecting tab 9 is bonded to the active material free side region 7 of the stripe-shaped positive electrode 3.

FIGS. 5A through 5D are fragmentary schematic perspective views illustrative of another method of bonding a positive electrode connecting tub to a depressed portion on the first side of the cylindrically shaped battery element of the nonaqueous electrolyte secondary battery in accordance with the present invention.

Figure 5A:
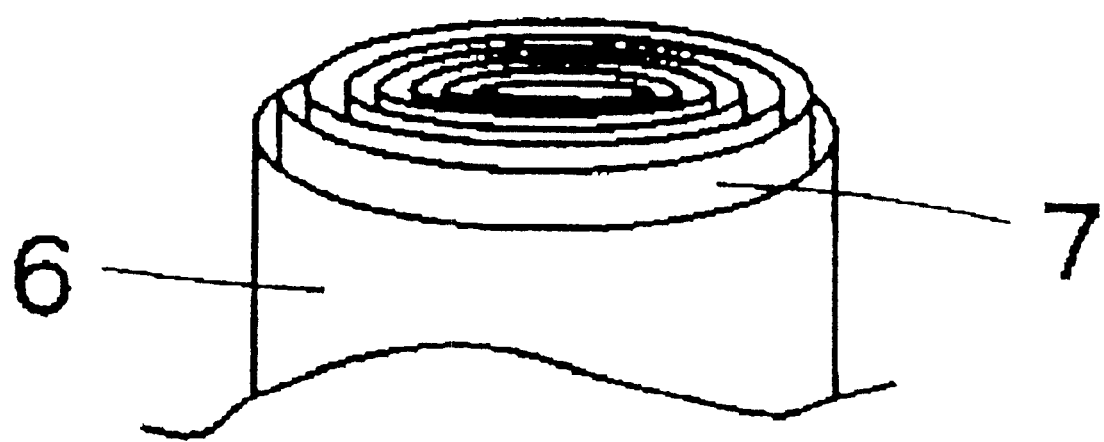
FIGS. 5A through 5D are fragmentary schematic perspective views illustrative of another method of bonding a positive electrode connecting tub to a depressed portion on the first side of the cylindrically shaped battery element of the nonaqueous electrolyte secondary battery in accordance with the present invention.

With reference to FIG. 5A the stripe-shaped separator 5 and the stripe-shaped positive and negative electrodes 3 and 4 are laminated so that the stripe-shaped separator 5 is sandwiched between the stripe-shaped positive and negative electrodes 3 and 4, wherein the projecting edge region of the active material free side region 7 of the stripe-shaped positive electrode collector 21 of the stripe-shaped positive electrode 3 projects from the first side edge of the stripe-shaped separator 5, whilst the projecting edge region of the active material free side region 15 of the stripe-shaped negative electrode collector 23 of the stripe-shaped negative electrode 4 projects from the second side edge of the stripe-shaped separator 5 thereby to form a lamination structure. This lamination structure is then rolled to form the cylindrically shaped battery element 6, so that the first side of the cylindrically shaped battery element 6 comprises the projecting edge region of the active material free side region 7 of the stripe-shaped positive electrode collector 21 of the stripe-shaped positive electrode 3 whilst the second side of the cylindrically shaped battery element 6 comprises the projecting edge region of the active material free side region 15 of the stripe-shaped negative electrode collector 23 of the stripe-shaped negative electrode 4.

Figure 5B:
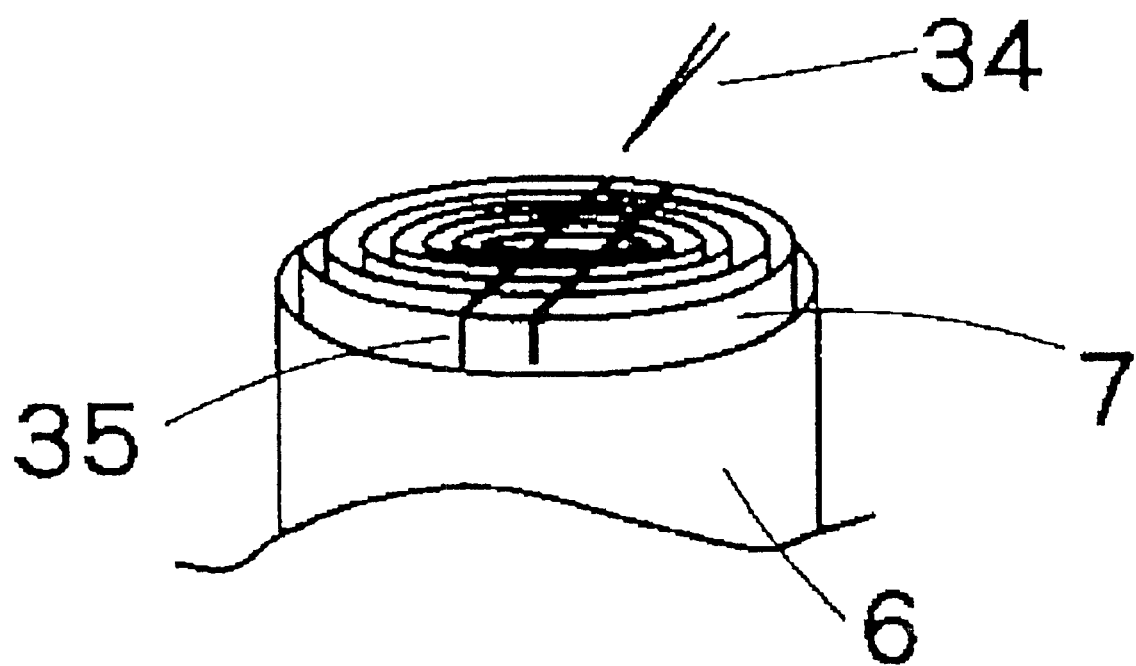

With reference to FIG. 5B, the first side of the rolled structure or the cylindrically shaped battery element 6 is subjected to a laser beam irradiation 34 by use of a YAG-laser, wherein the laser beam irradiation 34 is applied to two parallel straight cutting lines 35 which defines a straight stripe-shaped region extending in the diametrical direction and across the center of the center axis of the rolled structure or the cylindrically shaped battery element 6, so that the projecting edge region of the active material free side region 7 of the stripe-shaped positive electrode collector 21 of the stripe-shaped positive electrode 3 is cut along the two parallel straight cutting lines 35 to form fragmentary cut portions defined between the two parallel straight cutting lines 35.

Figure 5C:
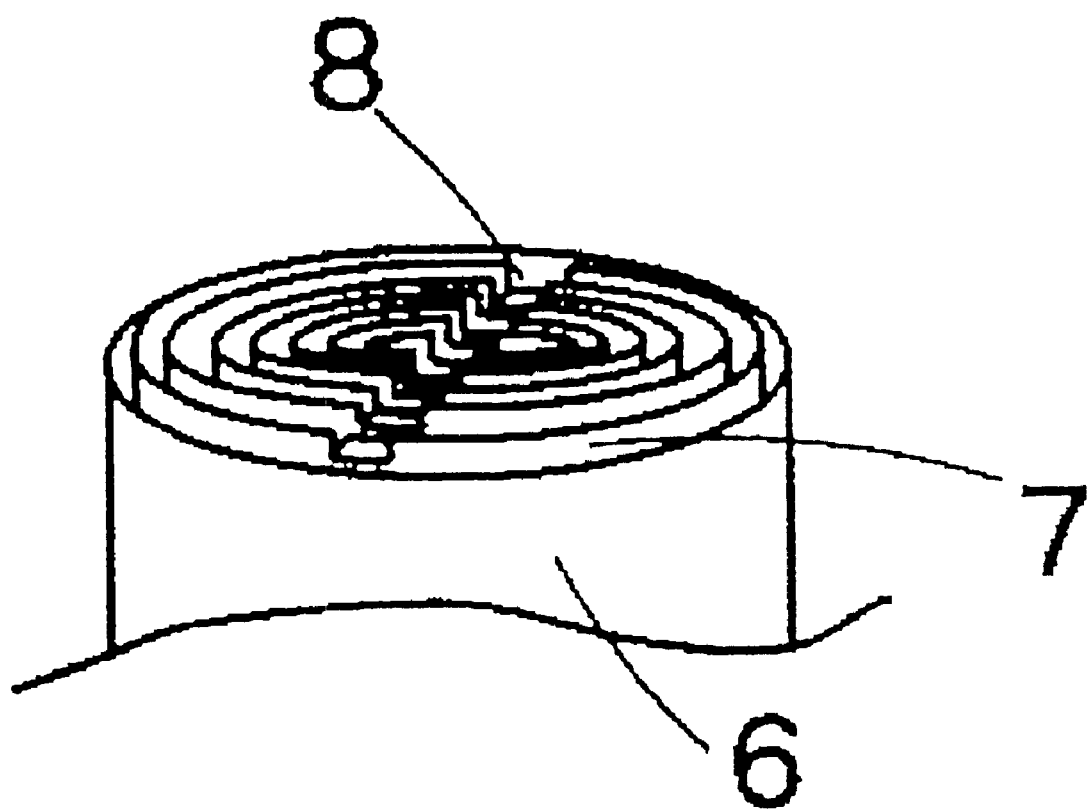

With reference to FIG. 5C, the fragmentary cut portions of the projecting edge region of the active material free side region 7 of the stripe-shaped positive electrode collector 21 of the stripe-shaped positive electrode 3 are bent toward a parallel direction to a plane of the first side of the cylindrically shaped battery element 6, so that the depressed portion 8 is formed on the first side of the rolled structure or the cylindrically shaped battery element 6, wherein the depressed portion 8 forms the straight slender-shaped groove which extends in the diametrical direction across the center axis of the rolled structure or the cylindrically shaped battery element 6. The depressed portion 8 has a bottom comprising the bent fragmentary cut portions of the projecting edge region of the active material free side region 7.

Figure 5D:
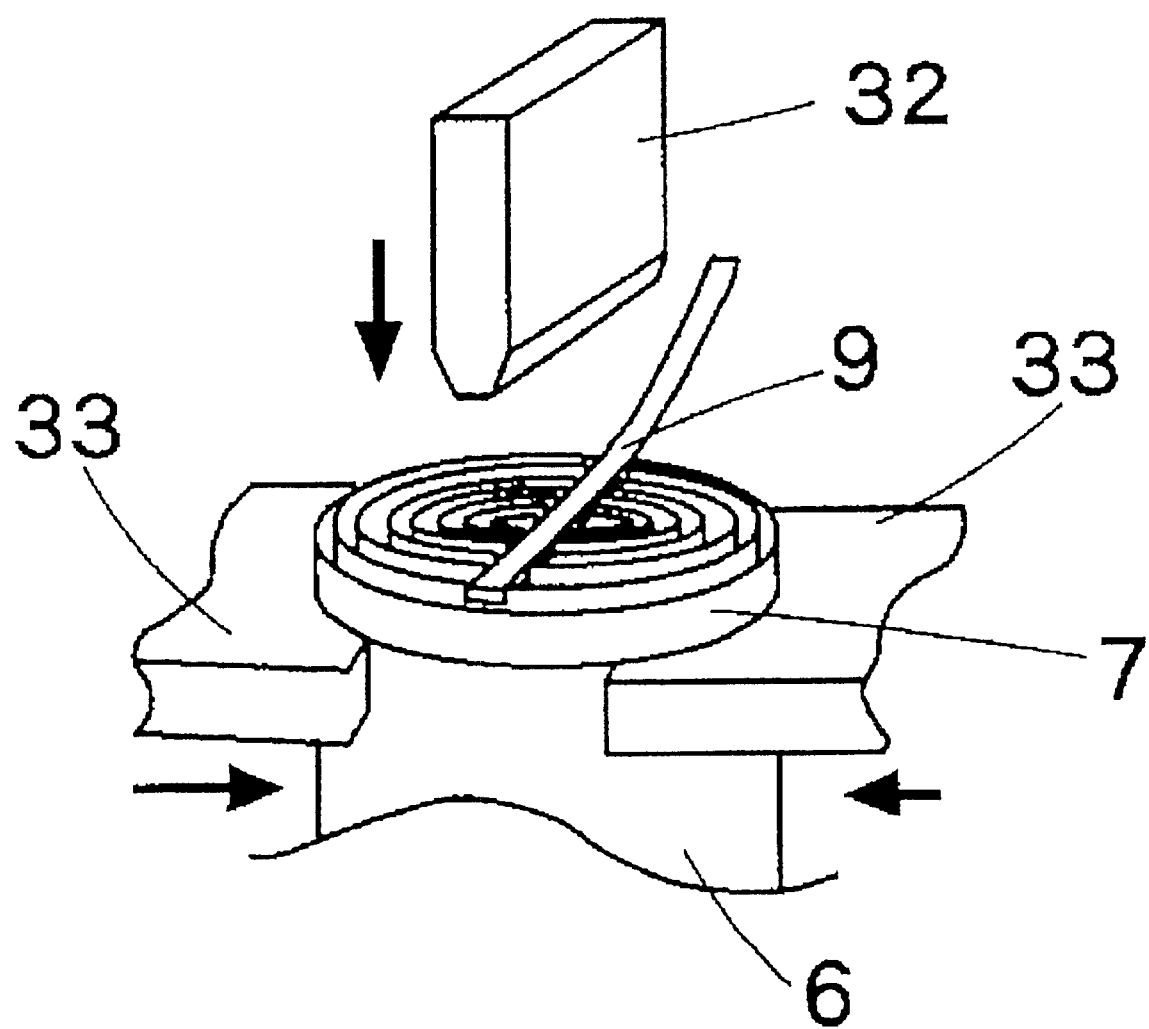

With reference to FIG. 5D, the positive electrode connecting tab 9 is so placed that the depressed portion 8 in the form of the straight slender-shaped groove receives the first contact part 9a of the positive electrode connecting tab 9. Namely, the first contact part 9a of the positive electrode connecting tab 9 extends along and is engaged within the groove of the depressed portion 8. The stripe-shaped positive electrode 3 is made of aluminum. A holder 33 is used for holding the cylindrically shaped battery element 6. A straight-ridge pressing tool 32 contacts the first contact part 9a of the positive electrode connecting tab 9 engaged within the depressed portion 8, so that the first contact part 9a of the positive electrode connecting tab 9 is bonded by an ultrasonic welding method to the depressed portion 8 on the first side of the rolled structure of the cylindrically shaped battery element 6. Namely, the first contact part 9a of the positive electrode connecting tab 9 is bonded to the active material free side region 7 of the stripe-shaped positive electrode 3.

Figure 6:
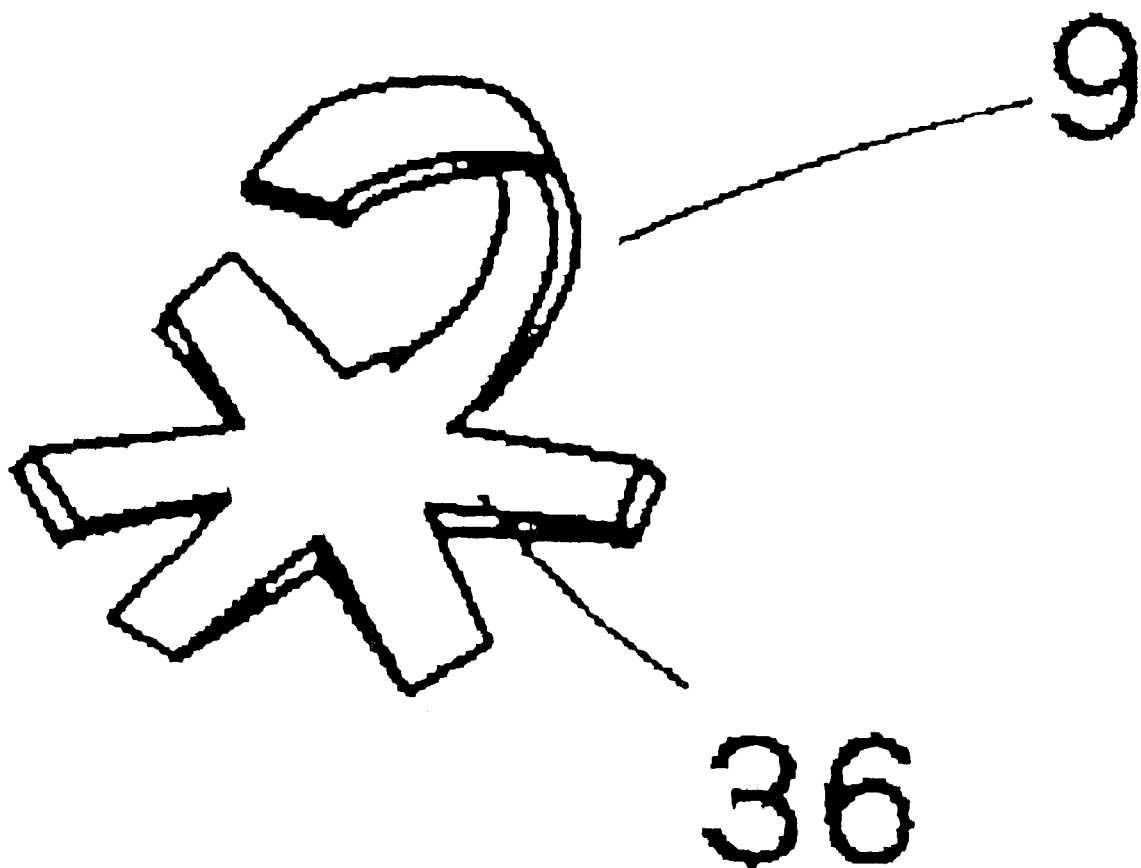
FIG. 6 is a schematic perspective view illustrative of a modified positive electrode connecting tub bonded to the first side of the cylindrically shaped battery element.

FIG. 6 is a schematic perspective view illustrative of a modified positive electrode connecting tab 9 that is to be bonded to the first side of the cylindrically shaped battery element. The first side of the rolled structure or the cylindrically shaped battery element 6, which comprises the active material free side region 7 of the stripe-shaped positive electrode 3, has a modified shaped depressed portion. Namely, the modified shaped depressed portion is formed in the active material free side region 7 of the stripe-shaped positive electrode 3. The modified shaped depressed portion on the first side of the rolled structure of the cylindrically shaped battery element 6 forms plural grooves which radially extend from a center of the first side of the cylindrically shaped battery element 6. The first contact parts 36 of the positive electrode connecting tab 9 also are in the form of radially extending plural segments, so that the depressed portion 8 in the form of the radially extending grooves receives the first contact parts 36 of the positive electrode connecting tab 9. Namely, the radially extending first contact parts 36 of the positive electrode connecting tab 9 extend along and are engaged within the radially extending grooves of the depressed portion 8. If the stripe-shaped positive electrode 3 is made of aluminum, the radially extending first contact parts 36 of the positive electrode connecting tab 9 are bonded by an ultrasonic welding method to the radially extending depressed portion 8 on the first side of the rolled structure or the cylindrically shaped battery element 6. Namely, the radially extending first contact parts 36 of the positive electrode connecting tab 9 are bonded to the active material free side region 7 of the stripe-shaped positive electrode 3. The radially extending first contact parts 36 of the positive electrode connecting tab 9 and the radially extending grooves of the depressed portion 8 increase the contact area between the positive electrode connecting tab 9 and the active material free side region 7 of the stripe-shaped positive electrode 3. Further, the radially extending first contact parts 36 of the positive electrode connecting tab 9 and the radially extending grooves of the depressed portion 8 allows a uniform current distribution.

The above present invention is applied to when the cylindrically shaped battery can 2 is made of aluminum and also serves as a positive electrode terminal.

No welding process for bonding the tab to the collector is carried out prior to the process for rolling the laminations of the positive and negative electrodes sandwiching the separator. It is unnecessary to provide a plurality of the tabs. The bonding of the tab to the collector is carried out by only the single process for welding the tab to the depressed portion on the one side of the cylindrically shaped battery element. The plural positions of the collector are electrically connected through the single tab to the terminal, thereby reducing an impedance. The single U-shaped intermediate portion of the tab extends through the inter-space between the first side of the cylindrically shaped battery element and the terminal of the battery header, whereby the efficient use of the inter-space between the first side of the cylindrically shaped battery element and the terminal of the battery header is increased.

Whereas modifications of the present invention will be apparent to a person having ordinary skill in the art, to which the invention pertains, it is to be understood that embodiments as shown and described by way of illustrations are by no means intended to be considered in a limiting sense. Accordingly, it is to be intended to cover by claims all modifications which fall within the spirit and scope of the present invention.

What is claimed is:

1. A nonaqueous electrolyte secondary battery having a cylindrically shaped battery element comprising positive and negative electrodes and a separator sandwiched between said positive and negative electrodes, each of said positive and negative electrodes having an active material free region, on which no active material is applied, said active material free region having a projecting edge region which projects or extends beyond a first side edge of said separator, wherein a first end of said cylindrically shaped battery element comprises said projecting edge region of said active material free region of one of said positive and negative electrodes, and said first end of said cylindrically shaped battery element has a depressed portion, wherein an electrode tab has a first portion engaged within and welded to said depressed portion and a second portion electrically in contact with an electrode terminal, and wherein said active material free region of said one of said positive and negative electrodes is laminated with a porous sheet having substantially the same thickness as a layer of said active material.

2. The nonaqueous electrolyte secondary battery as claimed in claim 1, wherein said depressed portion comprises a groove which extends on the first end of said cylindrically shaped battery element.

3. The nonaqueous electrolyte secondary battery as claimed in claim 2, wherein said groove comprises a single straight groove which extends across a center of said first end of said cylindrically shaped battery element, and said first portion of said electrode tab is in the form of a single straight sheet.

4. The nonaqueous electrolyte secondary battery as claimed in claim 2, wherein said groove comprises plural groove segments which radially extend from a center of said first end of said cylindrically shaped battery element, and said first portion of said electrode tab is in the form of radially extending plural segments.

5. The nonaqueous electrolyte secondary battery as claimed in claim 1, wherein said electrode tab has an U-curved intermediate portion unitarily connecting said first and second portions to each other.

6. The nonaqueous electrolyte secondary battery as claimed in claim 1, wherein said active material free region of said one of said positive and negative electrodes has a width in a direction parallel to an axis of said cylindrically shaped battery element, and said width is in a range of not less than a diametrical distance between adjacent ones of said one of said positive and negative electrodes to not more than a radius of said cylindrically shaped battery element.

7. The nonaqueous electrolyte secondary battery as claimed in claim 1, wherein said one of said positive and negative electrodes is made of aluminum and said first portion of said electrode tab is welded by an ultrasonic welding.

8. The nonaqueous electrolyte secondary battery as claimed in claim 7, wherein said one of said positive and negative electrodes is said positive electrode.

9. The nonaqueous electrolyte secondary battery as claimed in claim 7, wherein said electrode terminal in contact with said second portion of said electrode tab comprises an electrically conductive connective part of a battery cap.

10. A method of bonding an electrode tab to one side of a cylindrically shaped battery element of a nonaqueous electrolyte secondary battery, said method comprising the step of:

forming a cylindrically shaped battery element comprising positive and negative electrodes and a separator sandwiched between said positive and negative electrodes, each of said positive and negative electrodes having an active material free region, on which no active material is applied, said active material free region having a projecting edge region which projects or extends beyond a first side edge of said separator, so that a first end of said cylindrically shaped battery element comprises said projecting edge region of said active material free region of one of said positive and negative electrodes;

forming cutting lines extending through said projecting edge region by laser irradiation of said projecting edge region to form plural fragmentary cut parts of said projecting edge region defined by said cutting lines;

bending said plural fragmentary cut parts toward a direction parallel to a plane of said first end of said cylindrically shaped battery element to form a depressed portion on said first end of said cylindrically shaped battery element;

placing a first portion of an electrode tab within said depressed portion; and welding said first portion of said electrode tab to said depressed portion.

11. The method as claimed in claim 10, wherein said first portion of said electrode tab is welded by an ultrasonic welding method.

12. The method as claimed in claim 10, wherein said depressed portion is formed by pressing a pressing tool into said first end of said cylindrically shaped battery element.

13. The method as claimed in claim 10, further comprising the step of laminating a porous sheet on said active material free region, said porous sheet having substantially the same thickness as a layer of said active material.

* * * * *